(12) United States Patent
Liu et al.

(10) Patent No.: US 12,212,868 B1
(45) Date of Patent: Jan. 28, 2025

(54) LED LIGHT IDENTIFICATION METHOD, DEVICE, ELECTRONIC APPARATUS AND STORAGE MEDIUM

(71) Applicants: Hubei University of Economics, Hubei (CN); Dachang Technology Development Co., Ltd, Wuhan (CN)

(72) Inventors: Wenping Liu, Hubei (CN); Guoqiang Fu, Wuhan (CN); Yufu Jia, Hubei (CN); Zhenjiang Liu, Hubei (CN); Peiqiang Jin, Hubei (CN); Peiwen Xiong, Hubei (CN); Sihan Li, Hubei (CN); Xiao Xie, Hubei (CN)

(73) Assignees: Hubei University of Economics, Hubei (CN); Dachang Technology Development Co., Ltd, Wuhan (CN)

( * ) Notice: Subject to any disclaimer, the term of this patent is extended or adjusted under 35 U.S.C. 154(b) by 0 days.

(21) Appl. No.: 18/786,638

(22) Filed: Jul. 29, 2024

(30) Foreign Application Priority Data

Dec. 27, 2023 (CN) .......................... 202311816144.X

(51) Int. Cl.
   *H04N 25/76* (2023.01)
   *G01S 1/70* (2006.01)
   *G01S 11/12* (2006.01)
   *G06V 10/00* (2022.01)

(52) U.S. Cl.
   CPC ............... *H04N 25/76* (2023.01); *G01S 1/70* (2013.01); *G01S 11/12* (2013.01); *G06V 10/00* (2022.01)

(58) Field of Classification Search
   CPC ........... H04N 25/76; G01S 1/70; G01S 11/12; G06V 10/00
   See application file for complete search history.

(56) References Cited

U.S. PATENT DOCUMENTS

| | | | | |
|---|---|---|---|---|
| 2007/0115361 | A1* | 5/2007 | Bolas ................... | H04N 9/3194 |
| | | | | 348/189 |
| 2020/0314316 | A1* | 10/2020 | Hagenburg ........... | H04N 23/745 |
| 2020/0389582 | A1* | 12/2020 | Herman ................ | H04N 23/71 |
| 2021/0259071 | A1* | 8/2021 | Cavacuiti ............. | H04W 4/025 |
| 2023/0061655 | A1* | 3/2023 | Kobayashi ........... | H04N 23/73 |

* cited by examiner

Primary Examiner — Ming Y Hon
(74) Attorney, Agent, or Firm — JCIPRNET

(57) ABSTRACT

The disclosure provides an LED light identification method, device, electronic apparatus, and storage medium, belonging to the technical field of indoor positioning and navigation. The method includes: obtaining a background frame and a spline frame by a CMOS camera in an LED lighting environment; determining a target quantity of dark stripes in the spline frame by comparing the background frame with the spline frame; determining a target switching frequency corresponding to the target quantity based on a predetermined corresponding relationship and the target quantity. The target switching frequency is used to mark LED lights. By determining the target switching frequency corresponding to the target quantity and determining the target LED lights having the target switching frequency, it can be determined that the current position of the CMOS camera is near the target LED light.

13 Claims, 3 Drawing Sheets

---

Obtain a background frame and a spline frame by s CMOS camera in an LED lighting environment — S10

A target quantity of the dark stripes in the spline frame is determined by comparing the background frame with the spline frame — S20

Based on the predetermined corresponding relationship and the target quantity, a target switching frequency corresponding to the target quantity is determined — S30

LED LIGHT IDENTIFICATION METHOD, DEVICE, ELECTRONIC APPARATUS AND STORAGE MEDIUM

CROSS-REFERENCE TO RELATED APPLICATION

This application claims the priority benefit of China application serial no. 202311816144.X, filed on Dec. 27, 2023. The entirety of the above-mentioned patent application is hereby incorporated by reference herein and made a part of this specification.

BACKGROUND

Technical Field

The disclosure belongs to the technical field of indoor positioning and navigation, and more specifically, relates to an LED light identification method, device, electronic apparatus, and storage medium.

Description of Related Art

The realization of indoor positioning and navigation functions is often closely related to the beacons deployed in indoor environments. For example, multiple Bluetooth beacons are deployed indoors, and the mobile phone Bluetooth is used to receive signals to locate the user and perform navigation; or a certain number of radio frequency identification (RFID) readers and writers are placed indoors to locate the user and perform navigation by reading information on tags; another example is placing an ultrasonic transceiver indoors to locate the user and perform navigation according to the reflection of sound waves; further, using signals from WiFi access points to determine the location of the user is essentially implementing the WiFi access points as the beacons. All of the above types of beacons need to be additionally deployed in indoor environments, and some beacons change frequently, such as WiFi beacons. Light Emitting Diode (LED) lights have the function of lighting in indoor environments, and using the LED lights as beacons can make up for the disadvantages of applications of the above types of beacons.

Currently, there are several ways to use LED lights to achieve indoor positioning. For example, a first way is multilateral positioning. The distance between the LED light and the receiver is measured, and position coordinates of the receiver are estimated and calculated with the help of the geometric relationship thereof. Typical ranging methods include, for example, time of arrival (TOA), time difference of arrival (TDOA), angle of arrival (AOA), and received signal strength (RSS). A second way is fingerprint recognition method. In the offline stage, fingerprint features such as light intensity, pulse response time, or extinction ratio of LED light signals are collected and processed. In the online stage, the receiver position is estimated by model matching through the nearest neighbor algorithm, naive Bayes algorithm or backpropagation (BP) neural network algorithm. A third way is the image sensor imaging method. This type of method is based on the pinhole imaging principle and estimates the position of the receiver with the help of relevant parameters of the image sensor and the relative position relationship between coordinates of the object point and the image point. Generally, the receiver uses a monocular camera or a binocular camera to image multiple LED lights.

The positioning methods generally require special design of the receiver. For example, the AOA method requires a special antenna array to support the receiver. For the TOA method, precise time synchronization between the receiver and the LED is required. For the fingerprint method, a lot of calibration is required in the early stage, the fingerprint map maintenance is complicated, and the receiver is complex to manufacture. For the imaging method, the calculation is complex, and the hardware complexity of the receiver is high. How to efficiently use LED lights for indoor positioning is a technical problem that needs to be solved urgently in the industry.

SUMMARY

In view of the problems existing in the related art, the disclosure provides an LED light identification method, device, electronic apparatus, and storage medium.

In the first aspect, the disclosure provides an LED light identification method, which includes the following:

In an LED lighting environment, a background frame and a spline frame are obtained by a CMOS camera, the background frame is an image without dark stripes, and the spline frame is an image having dark stripes.

A target quantity of the dark stripes in the spline frame is determined by comparing the background frame with the spline frame.

Based on a predetermined corresponding relationship and the target quantity, a target switching frequency corresponding to the target quantity is determined, in which the predetermined corresponding relationship is used to characterize the corresponding relationship between the dark stripe quantity and the LED light switching frequency, and the target switching frequency is used to mark LED lights.

Each LED light in the LED lighting environment adopts a default switching frequency f and a target switching frequency $f_i$ respectively in two adjacent lighting intervals, different LED lights adopt different target switching frequencies, $f > W/S$, $f_i < W/S$, $T > 2S$, S represents a shutter duration of the CMOS camera, the CMOS camera collects images by adopting a column-by-column scanning manner, W represents a width of the image collected by the CMOS camera, and T represents the lighting interval.

Optionally, determining the target quantity of the dark stripes in the spline frame by comparing the background frame with the spline frame includes the following:

Based on the background frame, the spline frame, and the binarization threshold, the frame difference is calculated and binarization is performed, and a binary image is obtained. The value of each pixel in the binary image is used to characterize the difference between the background frame and the spline frame at the corresponding pixel, and the difference characterized by the binary value 1 is greater than the difference characterized by the binary value 0.

A one-dimensional array is determined by calculating the quantity of the pixels having the binary value in each column in the binary image.

Based on a predetermined window size, window division for gradient calculation is performed on the one-dimensional array to generate a window linked list, in which the window linked list is used to store window values corresponding to each window in a linked list manner.

Based on the window linked list, the window values corresponding to the windows are compared to determine the states corresponding to the windows, in which the states corresponding to the windows are used to characterize whether the column selected of the window has the dark stripes.

Based on the states corresponding to the respective windows, the target quantity of the dark stripes in the spline frame is determined.

Optionally, performing window division for gradient statistics on the one-dimensional array based on the predetermined window size to generate the window linked list includes the following.

Based on the predetermined accumulated gradient calculation configuration, the window values corresponding to the respective windows are calculated.

Based on the window values corresponding to the respective windows, the window linked list is generated in a linked list manner.

The predetermined accumulated gradient calculation configuration is used to indicate:

For the first window, when the absolute value of the accumulated gradient is smaller than or equal to the predetermined critical threshold, the mean value of all array elements in the first window is used as the window value of the entire window. When the accumulated gradient is smaller than the negative value of the predetermined critical threshold, the value of the first array element in the first window is used as the window value of the entire window and the state corresponding to the first window is set to the top state. The top state is used to characterize that the column selected of the window does not have the dark stripes. When the accumulated gradient is greater than the predetermined critical threshold, the value of the first array element in the first window is used as the window value of the entire window and the state corresponding to the first window is set to the bottom state. The bottom state is used to characterize that the column selected of the window has the dark stripes.

For any target window except the first window, when the absolute value of the accumulated gradient is smaller than or equal to the predetermined critical threshold, the mean value of all array elements in the target window is used as the window value of the entire window; otherwise, the value of the last array element in the target window is used as the window value of the entire window.

Optionally, comparing the window values corresponding to the respective windows based on the window linked list to determine the states corresponding to the respective windows includes the following:

According to the predetermined window merging configuration, merging is performed on the windows in the window linked list, and the window linked list after merging the windows is obtained. The predetermined window merging configuration is used to indicate that for two adjacent windows, if the absolute value of the difference between the window values corresponding to the two windows is smaller than or equal to the predetermined window difference, then the two windows are merged.

For the window linked list after merging the windows, when the state corresponding to the first window is not determined, the state corresponding to the first window is determined based on the window value corresponding to the first window and the window value corresponding to the second window.

For the window linked list after merging the windows, based on the state corresponding to the first window and the window values corresponding to each window, the state corresponding to each intermediate window is determined.

For the window linked list after merging the windows, based on the window value corresponding to the reversed second window and the window value corresponding to the last window, the state corresponding to the last window is determined.

Optionally, for the window linked list after merging the windows, when the state corresponding to the first window is not determined, determining the state corresponding to the first window based on the window value corresponding to the first window and the window value corresponding to the ordered second window includes the following:

Values of the window value corresponding to the first window and the window value corresponding to the ordered second window are compared.

If the window value corresponding to the first window is smaller than the window value corresponding to the ordered second window, then the state corresponding to the first window is determined to be the bottom state; otherwise, the state corresponding to the first window is determined to be the top state.

Optionally, for the window linked list after merging the windows, determining the states corresponding to the respective intermediate windows based on the state corresponding to the first window and the window values corresponding to the respective windows includes the following:

For the window linked list after merging the windows, an operation of recursively setting the states of the intermediate windows is performed starting from the reversed second window.

The operation of recursively setting the states of the intermediate windows specifically includes as follows:

If the state corresponding to the previous window of the target intermediate window is not determined, then the operation of recursively setting the state of the intermediate window is performed on the previous window of the target intermediate window;

If the state of the previous window of the target intermediate window is determined, then the state corresponding to the target intermediate window is determined or the window is merged based on the predetermined intermediate window processing configuration, the state corresponding to the previous window of the target intermediate window, the window value corresponding to the target intermediate window, and the window value corresponding to the next window of the target intermediate window;

The predetermined intermediate window processing configuration is used to indicate the following:

If the state corresponding to the previous window of the target intermediate window is the top state, when the window value corresponding to the target intermediate window is smaller than the window value corresponding to the next window of the target intermediate window, the state corresponding to the target intermediate window is set to the bottom state; when the window value corresponding to the target intermediate window is greater than the window value corresponding to the next window of the target intermediate window, the target intermediate window is merged with the next window of the target intermediate window, and the window value corresponding to the next window of the target intermediate window is used as the window value corresponding to the merged window;

If the state corresponding to the previous window of the target intermediate window is the bottom state, when the window value corresponding to the target intermediate window is greater than the window value corresponding to the next window of the target intermediate window, the state corresponding to the target intermediate window is set to the top state; when the window value corresponding to the target intermediate window is smaller than the window value corresponding to the next window of the target intermediate window, the target intermediate window is merged with the next window of the target intermediate window, and the window value corresponding to the next window of the target intermediate window is used as the window value corresponding to the merged window.

Optionally, for the window linked list after merging the windows, determining the state corresponding to the last window based on the window value corresponding to the reversed second window and the window value corresponding to the last window includes the following:

When the window value corresponding to the last window is smaller than the window value corresponding to the reversed second window, the state corresponding to the last window is set to the bottom state; otherwise, the state corresponding to the last window is set to the top state.

In the second aspect, the disclosure further provides an LED light identification device, which includes the following:

An image obtaining module is used to obtain a background frame and a spline frame by a CMOS camera in an LED lighting environment, in which the background frame is an image without dark stripes, and the spline frame is an image having dark stripes;

A dark stripe determination module is configured to determine a target quantity of dark stripes in the spline frame by comparing the background frame with the spline frame;

A switching frequency determination module is used to determine a target switching frequency corresponding to the target quantity based on a predetermined corresponding relationship and the target quantity, in which the predetermined corresponding relationship is used to characterize the corresponding relationship between the dark stripe quantity and the LED light switching frequency, and the target switching frequency is used to mark LED lights;

Among of them, each LED light in the LED lighting environment adopts the default switching frequency f and the target switching frequency $f_i$ respectively in two adjacent lighting intervals, different LED lights adopt different target switching frequencies, $f>W/S$, $f_i<W/S$, $T>2S$, S represents the shutter duration of the CMOS camera, the CMOS camera collects images by a line-by-line scanning manner, W represents the width of the image captured by the CMOS camera, and T represents the lighting interval.

In the third aspect, the disclosure provides an electronic apparatus, including at least one memory configured to store a program, and at least one processor configured to execute the program stored in the memory. When the program stored in the memory is executed, the processor is used to execute the method described in the first aspect or any possible implementation manner of the first aspect.

In the fourth aspect, the disclosure provides a computer-readable storage medium, and the computer-readable storage medium stores a computer program. When the computer program is executed on a processor, the processor is caused to execute the method described in the first aspect or any possible implementation of the first aspect.

It may be understood that the beneficial effects of the second aspect to the fourth aspect may be found in the relevant description of the first aspect, so details will not be repeated here.

BRIEF DESCRIPTION OF THE DRAWINGS

In order to more clearly illustrate the technical solutions in the disclosure or the related art, the following briefly introduces the drawings to be used in the description of the embodiments or the related art. Certainly, the drawings described below are some embodiments of the disclosure. For ordinary technicians in this field, other drawings may be obtained according to the drawings without any creative effort.

DESCRIPTION OF THE EMBODIMENTS

In order to make the purpose, technical solutions, and advantages of the disclosure more comprehensible, the disclosure is further described in detail below together with the accompanying drawings and embodiments. It should be understood that the specific embodiments described herein are only used to explain the disclosure, and the embodiments are not used to limit the disclosure.

In the embodiments of the disclosure, words such as "illustrative" or "for example" are used to indicate examples, instances, or illustrations. Any embodiment or design described as "illustrative" or "for example" in the embodiments of the disclosure should not be construed as being preferred or advantageous over other embodiments or designs. Rather, the use of words such as "illustrative" or "for example" are intended to present the relevant concepts in a concrete fashion.

In the description of the embodiments of the disclosure, unless otherwise specified, the meaning of "multiple" refers to two or more than two, for example, multiple processing units refers to two or more processing units; a plurality of elements refers to two or more elements.

Next, the technical solution provided in the embodiments of the disclosure is introduced.

Figure 1:
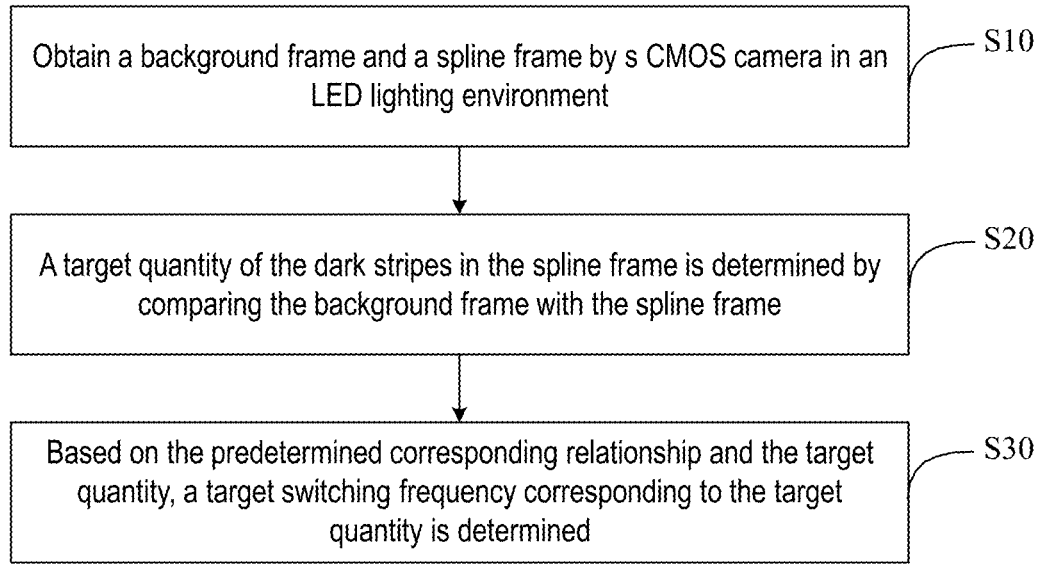
FIG. 1 is a schematic flow chart of an LED light identification method provided by the disclosure.

FIG. 1 is a schematic flow chart of an LED light identification method provided by the disclosure. As shown in FIG. 1, an execution subject of the LED light identification method may be an electronic apparatus, for example, any mobile terminal having a complementary metal-oxide-semiconductor (CMOS) camera photo capturing function. The method includes Step S10, Step S20, and Step S30 as follows.

In Step S10, in an LED lighting environment, a background frame and a spline frame are obtained by the CMOS camera, the background frame is an image without dark stripes, and the spline frame is an image having dark stripes.

Each LED light in the LED lighting environment adopts a default switching frequency f and a target switching frequency $f_i$ respectively in two adjacent lighting intervals, different LED lights adopt different target switching frequencies, $f>W/S$, $f_i<W/S$, $T>2S$, S represents a shutter duration of the CMOS camera, the CMOS camera collects images by adopting a column-by-column scanning manner, W represents a width of the image collected by the CMOS camera, and T represents the lighting interval.

Figure 2:
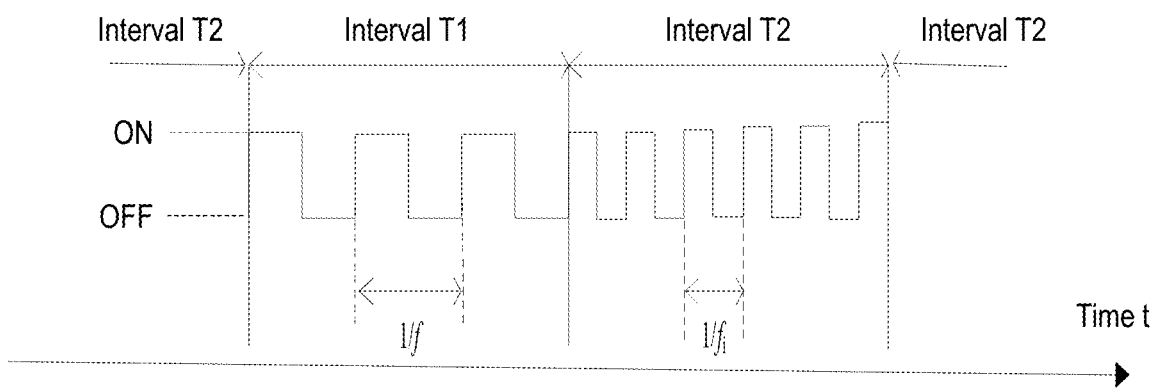
FIG. 2 is a schematic diagram of a lighting interval of the LED light provided by the disclosure.
Figure 3:
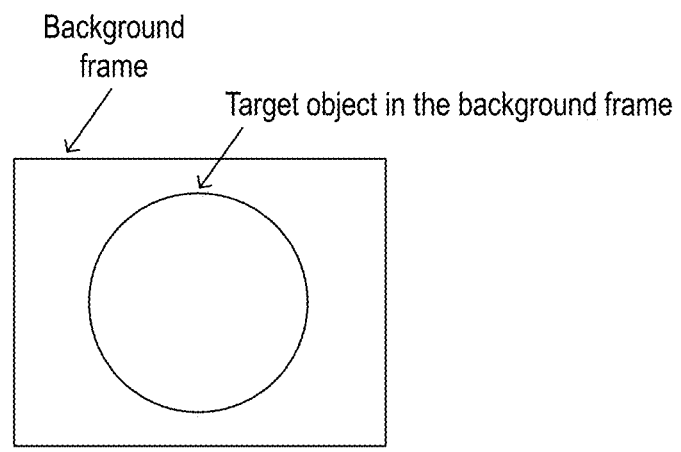
FIG. 3 is a schematic diagram of a background frame provided by the disclosure.
Figure 4:
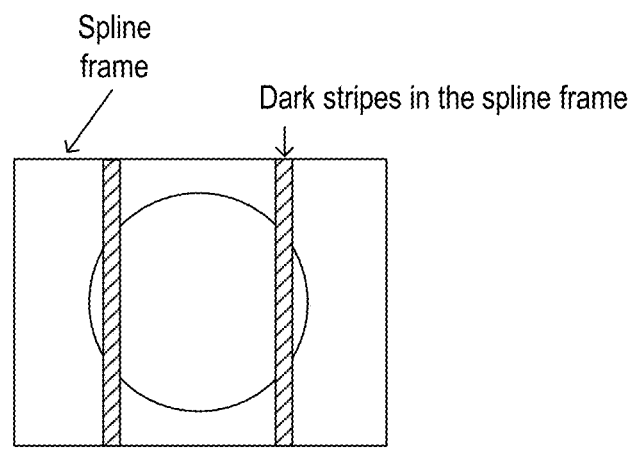
FIG. 4 is a schematic diagram of a spline frame provided by the disclosure.

Specifically, FIG. 2 is a schematic diagram of the lighting interval of the LED light provided by the disclosure. As shown in FIG. 2, two types of lighting intervals T1, T2 having equal duration are set, and an LED light $L_i$ (0<i<N+1, and N is a quantity of the LED lights) may be programmed and controlled on a single chip microcomputer so that $L_i$ is automatically turned on/off at a default switching frequency f in the interval T1 and is automatically turned on/off at a target switching frequency $f_i$ in the interval T2. In a time sequence, lighting is implemented in a manner of the intervals T1, T2 alternately and repeatedly. Assuming a shutter duration of the CMOS camera is S, an image width is W, the default switching frequency f should satisfy the condition f>W/S, and the target switching frequency $f_i$ should satisfy the condition $f_i$<W/S. The limiting condition is to utilize the rolling shutter effect of the CMOS camera. FIG. 3 is a schematic diagram of the background frame provided by the disclosure, and FIG. 4 is a schematic diagram of the spline frame provided by the disclosure. As shown in FIG. 3, the CMOS camera may obtain the image (the background frame) without dark stripes in the interval T1. As shown in FIG. 4, the CMOS camera may obtain the image (the spline frame) having the dark stripes in the interval T2.

Regarding the "dark stripes": the frequency of the LED light $L_i$ is set to $f_i$<W/S. When the CMOS camera senses light layer by layer, since $L_i$ is in an off state and cannot sense light, as a result, the image collected has black stripes. Since indoor ambient lighting usually does not come from a single light source, the CMOS camera also senses light from other light sources, as a result, the image collected has the dark stripes.

All LED lights are set to the same default switching frequency f but set to different target switching frequencies $f_i$. The limiting condition is to ensure that the CMOS camera may obtain images having different quantities of the dark stripes under different LED illumination in the interval T2. The durations of the intervals T1, T2 should be greater than twice the camera shutter duration. The limiting condition is to enable the camera to obtain a complete background frame in the interval T1 and to obtain a complete spline frame in the interval T2, thereby synchronization between the LED and the camera is achieved. Values of T1, T2, f, and $f_i$ are based on the premise that there is no flicker being perceived by the naked eye in a normal lighting environment.

Illustratively, Step S10 specifically includes Step S11, Step S12, and Step S13 as follows.

In Step S11, for any stationary target object in the LED lighting environment, the CMOS camera is used to capture photos sequentially and continuously, and a first image P1 and a second image P2 are obtained.

In Step S12, after the lighting interval, the CMOS camera is again used to capture photos sequentially and continuously, and a third image P3 and a fourth image P4 are obtained.

In Step S13, based on the first image P1, the second image P2, the third image P3, and the fourth image P4, the background frame and the spline frame are screened out from the four images by comparing brightness sums of pixels.

Specifically, grayscale images corresponding to the images P1, P2, P3, and P4 are found, and the brightness sum of all pixels in each grayscale image is calculated. If the brightness sum of the grayscale image corresponding to P1 or P3 is the largest, then P1 and P3 are kept. If the brightness sum of the grayscale image corresponding to P2 or P4 is the largest, then P2 and P4 are kept. In the images kept, the image corresponding to the largest brightness sum is the background frame, and the other image is the spline frame.

The grayscale image mentioned-above has the same height and width as the original RGB image. A brightness value of the pixel in the grayscale image is an average brightness value of the three primary colors R, G, and B of a corresponding pixel in the original image.

The brightness sum of the pixels means: the sum of grayscale values of all pixels in the grayscale image corresponding to the image is found, and the value of the sum is used as the brightness sum.

It should be understood that if only one image is captured, the shutter period corresponding to this image may span the lighting interval T1 and the lighting interval T2. To avoid this situation, the two images P1, P2 may be captured, and since the duration of the lighting intervals T1, T2 is greater than twice the shutter time of the camera, if one of the two images P1, P2 has a corresponding shutter period spanning the lighting intervals T1, T2, then the corresponding shutter period of the other image (as the target image) does not span the lighting interval T1 and the lighting interval T2. This target image may be used as the background frame (without the dark stripes) or the spline frame (having the dark stripes). Correspondingly, after the target image is captured, a lighting interval is waited, and the next captured image is used as the spline frame or the background frame.

For example, if the brightness sum of the grayscale image corresponding to P1 or P3 is the largest, then the target image is P1, and P1, P3 are kept. Further, the image having the largest brightness sum in the kept images P1, P3 is the background frame, and the other image is the spline frame.

For example, if the brightness sum of the grayscale image corresponding to P2 or P4 is the largest, then the target image is P2, and P2, P4 are kept. Further, the image having the largest brightness sum in the kept images P2, P4 is the background frame, and the other image is the spline frame.

The background frame may be found through the method of the largest brightness sum of the grayscale image. Since the largest brightness sum of the grayscale image indicates that the image does not have dark stripes and does not span two lighting intervals, the image with the largest brightness sum of the grayscale image is the background frame.

In Step S20, a target quantity of the dark stripes in the spline frame is determined by comparing the background frame with the spline frame.

In Step S30, based on the predetermined corresponding relationship and the target quantity, a target switching frequency corresponding to the target quantity is determined, in which the predetermined corresponding relationship is used to characterize the corresponding relationship between a dark stripe quantity and an LED light switching frequency, and the target switching frequency is used to mark LED lights.

It may be understood that each LED light in the LED lighting environment uses a default switching frequency f and a target switching frequency $f_i$ respectively in two adjacent lighting intervals, different LED lights use different target switching frequencies (used to mark different LED lights). The CMOS camera collects images in a column-by-column scanning manner. By setting appropriate default switching frequency f (f>W/S), target switching frequency $f_i$ ($f_i$<W/S), and lighting interval (T>2S), the background frame without the dark stripes and the spline frame having the dark stripes may be collected in the LED lighting environment, and by comparing the background frame with the spline frame, the target quantity of the dark stripes in the spline frame may be determined. Further, based on the corresponding relationship between the dark stripe quantity and the LED light switching frequency, the target switching frequency corresponding to the target quantity may be determined, as well as the target LED light with the target switching frequency. Further, it may be determined that the current position of the CMOS camera is near the target LED light (experiments show that it can be located within 5 meters of the target LED light). The LED lights are used effectively for indoor positioning, and with the assistance of other positioning technologies, accurate positioning of mobile terminals can be achieved.

Optionally, Step S20 specifically includes Step S21, Step S22, Step S23, Step S24, and Step S25 as follows.

In Step S21, based on the background frame, the spline frame, and a binarization threshold, a frame difference is calculated and binarization is performed, and a binary image is obtained. The value of each pixel in the binary image is used to characterize the difference between the background frame and the spline frame at the corresponding pixel. The difference characterized by the binary value 1 is greater than the difference characterized by the binary value 0.

Specifically, regarding calculating the frame difference: a new RGB three-primary color image Image is generated, and the height and width of the image Image are the same as the height and width of the background frame or the spline frame. The R primary color brightness value of a pixel point on the image Image is the absolute value of the difference between the R primary color brightness value of the pixel point at the corresponding position on the background frame and the R primary color brightness value of the pixel point at the corresponding position on the spline frame; the G primary color brightness value of a pixel point on the image Image is the absolute value of the difference between the G primary color brightness value of the pixel point at the corresponding position on the background frame and the G primary color brightness value of the pixel point at the corresponding position on the spline frame; the B primary color brightness value of a pixel point on the image Image is the absolute value of the difference between the B primary color brightness value of the pixel point at the corresponding position on the background frame and the B primary color brightness value of the pixel point at the corresponding position on the spline frame.

Regarding the "binarization": first, the RGB three-primary color image Image is converted into grayscale. That is, the image Image is changed from a 24-bit image to an 8-bit image, and the average value of the brightness values of the three primary colors R, G, and B of the pixel in the image Image is used as the grayscale value of the pixel. Then the image Image is changed from a grayscale image to a binary image. That is, when the grayscale value of a pixel in the image Image is greater than the empirical threshold (that is, the binarization threshold), the grayscale of the pixel is set to 255; when the grayscale value of a pixel in the image Image is smaller than the empirical threshold, the grayscale of the pixel is set to 0.

In Step S22, a one-dimensional array is determined by calculating the quantity of the pixels (which may be referred to as black pixels) having the binary value 0 in each column in the binary image. This one-dimensional array may be referred to as an array of black pixel points (ABPP).

Specifically, the column number of the binary image is used as the subscript, and the quantity of the pixels having a gray value of 0 in the column is used as the element value to obtain ABPP.

Figure 5:
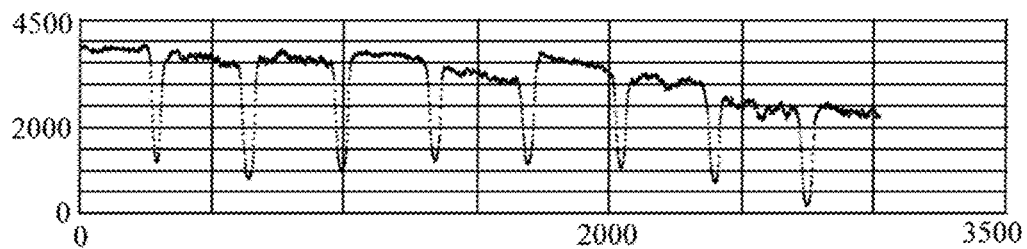
FIG. 5 is a schematic statistical diagram of black pixels provided by the disclosure.

It may be understood that each array element in the ABPP is used to characterize the quantity of all black pixels in the corresponding column. FIG. 5 is a schematic statistical diagram of black pixels provided by the disclosure. As shown in FIG. 5, the abscissa in FIG. 5 represents the sequence number of the array element, and the ordinate in FIG. 5 represents the value of the array element. Since the column where the dark stripe is located in the spline frame is quite different from the corresponding column in the background frame, there are more pixels having a value of 1 in the corresponding column in the binary image, and fewer pixels (that is, the black pixels) having a value of 0, so the value of the corresponding array element is smaller, and a trough is appeared in FIG. 5. In order to determine the quantity of the dark stripes in the spline frame (specifically, may be achieved through subsequent Steps S23, S24, and S25), multiple windows may be divided along the horizontal axis in FIG. 5, calculating is performed in the respective windows to determine the state of each window (a top state (corresponding to the top of the waveform in FIG. 5) or a bottom state (corresponding to the bottom of the waveform in FIG. 5)), and then the target quantity of the dark stripes in the spline frame is determined according to the state of each window.

In Step S23, based on the predetermined window size, window division for gradient calculation is performed on the one-dimensional array to generate a window linked list. The window linked list is used to store window values corresponding to each window in a linked list manner.

It should be understood that the window division method may be to divide into multiple windows along the direction of increasing serial numbers of array elements, and the window is used to select a number of consecutive array elements in the one-dimensional array, and gradient calculation is performed on the selected array elements. For a certain intermediate window, the first array element of the intermediate window is adjacent to the last array element of a previous window of the intermediate window, and the last array element of the intermediate window is adjacent to the first array element of a next window of the intermediate window. The predetermined window size is used to indicate the reference quantity of array elements selected of the window. For example, if the predetermined window size is 100, then the reference quantity of array elements selected of a window is 100.

For example, if the total quantity of array elements of the one-dimensional array is 1000 and the predetermined window size is 100, then the operation may be to divide 10 windows along the direction of increasing serial numbers of the array elements, and the quantity of array elements selected of each window is 100.

For example, if the total quantity of array elements of the one-dimensional array is 990 and the predetermined window size is 100, then the operation may be to divide 10 windows along the direction of increasing serial numbers of the array elements, the quantity of array elements selected of the first 9 windows is 100, and the quantity of array elements selected of the last window is 90.

Further, Step S23 specifically includes Step S231 and Step S232 as follows.

In Step S231, based on the predetermined accumulated gradient calculation configuration, the window values corresponding to each window are calculated.

In Step S232, based on the window values corresponding to each window, a window linked list is generated in a linked list manner.

The predetermined accumulated gradient calculation configuration is used to indicate the following.

For the first window, when the absolute value of the accumulated gradient is smaller than or equal to the predetermined critical threshold, the mean value of all array elements in the first window is used as the window value of the entire window. When the accumulated gradient is smaller than the negative value of the predetermined critical threshold, the value of the first array element in the first window is used as the window value of the entire window and the state corresponding to the first window is set to the top state. The top state is used to characterize that the column selected of the window does not have the dark stripes. When the accumulated gradient is greater than the predetermined critical threshold, the value of the first array element in the first window is used as the window value of the entire window and the state corresponding to the first window is set to the bottom state. The bottom state is used to characterize that the column selected of the window has the dark stripes.

For any target window except the first window, when the absolute value of the accumulated gradient is smaller than or equal to the predetermined critical threshold, the mean value of all array elements in the target window is used as the window value of the entire window; otherwise, the value of the last array element in the target window is used as the window value of the entire window.

Regarding the calculation method of the accumulated gradient of the windows: the value of the first array element of the window is subtracted from the value of the last array element of the window to obtain the difference, and then the difference is divided by the quantity of array elements selected of the window (for example, 100) to obtain a ratio, and the ratio may be used as the accumulated gradient of the window.

In Step S24, based on the window linked list, the window values corresponding to the respective windows are compared to determine the states corresponding to the respective windows. The state corresponding to the window is used to characterize whether the column selected of the window has the dark stripes.

Further, step S24 specifically includes Step S241, Step S242, Step S243, and Step S244 as follows.

In Step S241, according to the predetermined window merging configuration, merging is performed on the windows in the window linked list, and the window linked list after merging the windows is obtained. The predetermined window merging configuration is used to indicate that for two adjacent windows, if the absolute value of the difference between the window values corresponding to the two windows is smaller than or equal to the predetermined window difference, then the two windows are merged.

Regarding the method to merge two windows: if it is desired to merge two adjacent windows (for example, the first window and the second window, and the first window is the previous window of the second window), then the operation may be to expand the size of the first window to cover the array elements selected of the second window, that is, the newly added selected array elements of the new first window are the array elements of the second window, and the last array element of the new first window is the last element of the second window. Accordingly, the window value of the new first window may be determined. Specifically, the average value between the window value of the original first window and the window value of the second window may be calculated, and the average value may be used as the window value of the new first window. After the new first window is obtained, the second window may be deleted from the window linked list.

It should be understood that by merging windows, the quantity of intermediate windows may be reduced, thereby the subsequent times to determine states of intermediate windows are reduced, and processing efficiency is improved.

In Step S242, for the window linked list after merging the windows, when the state corresponding to the first window is not determined, the state corresponding to the first window is determined based on the window value corresponding to the first window and the window value corresponding to the second window.

Illustratively, Step S242 specifically includes the following:

Values of the window value corresponding to the first window and the window value corresponding to the ordered second window are compared;

If the window value corresponding to the first window is smaller than the window value corresponding to the ordered second window, then the state corresponding to the first window is determined to be the bottom state; otherwise, the state corresponding to the first window is determined to be the top state.

In Step S243, for the window linked list after merging the windows, based on the state corresponding to the first window and the window values corresponding to each window, the state corresponding to each intermediate window is determined.

Illustratively, Step S243 specifically includes the following:

For the window linked list after merging the windows, an operation of recursively setting the states of the intermediate windows is performed starting from the reversed second window.

The operation of recursively setting the states of the intermediate windows specifically includes as follows:

If the state corresponding to the previous window of the target intermediate window is not determined, then the operation of recursively setting the state of the intermediate window is performed on the previous window of the target intermediate window;

If the state of the previous window of the target intermediate window is determined, then the state corresponding to the target intermediate window is determined or the window is merged based on the predetermined intermediate window processing configuration, the state corresponding to the previous window of the target intermediate window, the window value corresponding to the target intermediate window, and the window value corresponding to the next window of the target intermediate window;

The predetermined intermediate window processing configuration is used to indicate the following:

If the state corresponding to the previous window of the target intermediate window is the top state, when the window value corresponding to the target intermediate window is smaller than the window value corresponding to the next window of the target intermediate window, the state corresponding to the target intermediate window is set to the bottom state; when the window value corresponding to the target intermediate window is greater than the window value corresponding to the next window of the target intermediate window, the target intermediate window is merged with the next window of the target intermediate window, and the window value corresponding to the next window of the target intermediate window is used as the window value corresponding to the merged window;

If the state corresponding to the previous window of the target intermediate window is the bottom state, when the window value corresponding to the target intermediate window is greater than the window value corresponding to the next window of the target intermediate window, the state corresponding to the target intermediate window is set to the top state; when the window value corresponding to the target intermediate window is smaller than the window value corresponding to the next window of the target intermediate window, the target intermediate window is merged with the next window of the target intermediate window, and the window value corresponding to the next window of the target intermediate window is used as the window value corresponding to the merged window.

It should be understood that when the state of each intermediate window is not determined, the process is recursively performed until the ordered second window.

In Step S244, for the window linked list after merging the windows, based on the window value corresponding to the reversed second window and the window value corresponding to the last window, the state corresponding to the last window is determined.

Illustratively, Step S244 specifically includes the following:

When the window value corresponding to the last window is smaller than the window value corresponding to the reversed second window, the state corresponding to the last window is set to the bottom state; otherwise, the state corresponding to the last window is set to the top state.

In Step S25, based on the corresponding state of each window, the target quantity of the dark stripes in the spline frame is determined.

The disclosure may utilize a mobile terminal to identify LED lighting lights, and only rely on setting different target switching frequencies $f_i$ within the lighting interval T2 of multiple LED lights, which is independent from the deployment layout between the LED lights, and does not require additional hardware design for the LED lights. The identification method only relies on the mobile terminal to collect scene images with a fixed image width W using a CMOS camera. The mobile terminal only needs to have simple image processing capabilities and does not require additional design or loading of special hardware modules. The dark stripe detection algorithm designed by the disclosure is based on the background frame and the spline frame, during the execution process, only three critical parameters need to be set, namely, the binarization threshold in Step S21, the predetermined critical threshold in Step S23, and the predetermined window difference in Step S24. The three critical parameters are not sensitive to changes in the indoor lighting environment. The dark stripe detection algorithm proposed in the disclosure has a linear relationship with the quantity of pixels of the background frame or the spline frame in terms of both time complexity and space complexity. Assuming that the width and height of the background frame or the spline frame are Width and Height respectively, then the computational complexity and space complexity of the algorithm in Step S21 and Step S22 are O ([Width×Height]), and the computational complexity and space complexity of the algorithm in Step S23 are O (Height). The computational complexity and space complexity of the algorithm in Step S24 and Step S25 are O (the quantity of windows n in the window linked list), and n is much lower than Height. Overall, the entire algorithm has good real-time performance.

In order to further improve the identification capability, the method of the disclosure may be expanded, that is, on the LED side, for example, lighting intervals T3, T4 are added, and on the mobile terminal side, the dark stripe detection algorithm proposed in the disclosure is used to identify the quantity of dark stripes in the spline frame within the lighting intervals T3, T4, and the identification capability of the system is increased by arranging and combining the quantities of the spline stripes. Therefore, the method proposed in the disclosure is applicable to positioning and navigation of any large indoor scene using LED lights as lighting sources.

The LED light identification method proposed in the disclosure relies on the mobile terminal to sense the light characteristics of the lighting environment, the algorithm is universal and applicable to positioning and navigation problems in large indoor scenes such as parking lots, shopping malls, exhibition halls, and museums. The algorithm has the advantages of real-time, low power consumption, and low complexity.

The LED light identification device provided by the disclosure is described below. The LED light identification device described below and the LED light identification method described above may be referred to each other.

Figure 6:
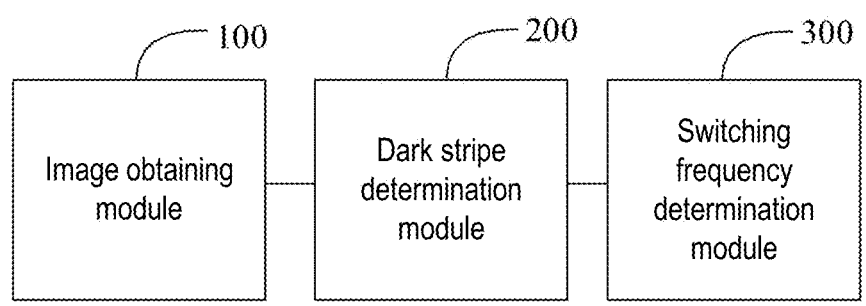
FIG. 6 is a schematic structural diagram of an LED light identification device provided by the disclosure.

FIG. 6 is a schematic structural diagram of the LED light identification device provided by the disclosure. As shown in FIG. 6, the device includes an image obtaining module 100, a dark stripe determination module 200, and a switching frequency determination module 300.

The image obtaining module 100 is used to obtain a background frame and a spline frame by a CMOS camera in an LED lighting environment, in which the background frame is an image without dark stripes, and the spline frame is an image having dark stripes.

The dark stripe determination module 200 is used to determine a target quantity of the dark stripes in the spline frame by comparing a background frame with a spline frame.

The switching frequency determination module 300 is used to determine a target switching frequency corresponding to the target quantity based on a predetermined corresponding relationship and a target quantity, in which the predetermined corresponding relationship is used to characterize the corresponding relationship between the dark stripe quantity and the LED light switching frequency, and the target switching frequency is used to mark LED lights.

Each LED light in the LED lighting environment adopts the default switching frequency f and the target switching frequency $f_i$ respectively in two adjacent lighting intervals, different LED lights adopt different target switching frequencies, f>W/S, $f_i$<W/S, T>2S, S represents the shutter duration of the CMOS camera, the CMOS camera collects images by a line-by-line scanning manner, W represents the width of the image captured by the CMOS camera, and T represents the lighting interval.

It should be understood that the device is used to execute the method in the above-mentioned embodiments. The implementation principle and technical effect of the corresponding program module in the device are similar to the description in the method, the working process of the device may be referred to the corresponding process in the method, so details will not be repeated here.

Based on the method in the embodiments, an electronic apparatus is provided according to the disclosure in the embodiments. The device may include at least one storage configured to store a program and at least one processor configured to execute the program stored in the storage. When the program stored in the storage is executed, the processor is used to execute the method described in the embodiments.

Based on the method in the embodiment, a computer-readable storage medium is provided according to the disclosure in one embodiment. The computer-readable storage medium stores a computer program, and when the computer program runs on a processor, the processor executes the method in the embodiment.

Based on the method in the embodiment, a computer program product is provided according to the disclosure in one embodiment. When the computer program product runs on a processor, the processor executes the method in the embodiment.

It should be understood that the processor in the embodiments of the disclosure may be a central processing unit (CPU), may also be other general-purpose processors, digital signal processors (DSP), application specific integrated circuit (ASIC), field programmable gate array (FPGA), or other programmable logic devices, transistor logic devices, hardware components or combinations thereof. A general purpose processor may be a microprocessor or any conventional processor.

The steps of the method in the embodiment of the disclosure may be implemented by hardware, or by a processor executing software commands. The software commands may include corresponding software modules, and the software modules may be stored in random access memory (RAM), flash memory, read-only memory (ROM), programmable ROM (PROM), erasable PROM (EPROM), electrically EPROM (EEPROM), register, hard disk, mobile hard disk, CD-ROM, or any other form of storage media known in the art. An exemplary storage medium is coupled to the processor such that the processor may read information from, and write information to, the storage medium. Certainly, the storage medium may also be an integral part of the processor. The processor and the storage medium may reside in an ASIC.

In some embodiments, the disclosure relates to a computer program product that includes one or more computer commands. When the computer program commands are loaded and executed on a computer, the process or function described in the embodiments of the disclosure is generated in whole or in part. The computer may be a general purpose computer, a special purpose computer, a computer network, or other programmable device. The computer commands may be stored in the computer-readable storage medium or transmitted via the computer-readable storage medium. The computer commands may be sent from a website, computer, server, or data center via a wired (for example, coaxial cable, optical fiber, digital subscriber line (DSL)) or wireless (for example, infrared, wireless, microwave) manner to another website, computer, server, or data center. The computer-readable storage medium may be any available medium that may be accessed by a computer or may be a data storage device such as a server or a data center including one or more available media. The available medium may be a magnetic medium (for example, a floppy disk, a hard disk, a magnetic tape), an optical medium (for example, a DVD), or a semiconductor medium (for example, a solid state disk (SSD)).

In general, the above technical solution conceived by the disclosure has beneficial effects as follows compared with the related art.

Each LED light source in the LED lighting environment performs lighting based on the switching frequency $f_i$ and the duty cycle. The CMOS camera uses the column-by-column scanning method to collect the images. By setting the appropriate switching frequency $f_i$ ($f_i$<W/S), spline frames having dark stripes may be collected under this LED lighting environment. The light source feature encoding sequence corresponding to the LED light source is determined based on the shutter duration, the image width, and the switching frequency and the duty cycle used by the LED light source. Since different LED light sources use different switching frequencies, different LED light sources use different duty cycles, thereby it is ensured that different LED light sources correspond to different light source feature encoding sequences, and the light source feature encoding sequence may uniquely mark the LED light source. After the spline frame is collected, the dark stripes in the spline frame may be detected by the target detection model to obtain the dark stripe detection result, and then each rectangular box in the dark stripe detection result may be preprocessed and the image feature encoding sequence of the spline frame is determined, then, the image feature encoding sequence may be compared with the light source feature encoding sequence corresponding to each LED light source to determine the light source feature encoding sequence that best matches the spline frame. Furthermore, it may be determined that the current position of the CMOS camera is near the LED light source marked by the best matching light source feature encoding sequence, so that LED lights may be efficiently used for indoor positioning, and assisted with other positioning technologies, precise positioning of the mobile terminal can be realized.

In general, the above technical solution conceived by the disclosure has the following beneficial effects compared with the related art:

It may be understood that each LED light in the LED lighting environment uses a default switching frequency f and a target switching frequency $f_i$ respectively in two adjacent lighting intervals, different LED lights use different target switching frequencies (used to mark different LED lights). The CMOS camera collects images in a column-by-column scanning manner. By setting appropriate default switching frequency f (f>W/S), target switching frequency $f_i$ ($f_i$<W/S), and lighting interval (T>2S), the background frame without the dark stripes and the spline frame having the dark stripes may be collected in the LED lighting environment, and by comparing the background frame with the spline frame, the target quantity of the dark stripes in the spline frame may be determined. Further, based on the corresponding relationship between the dark stripe quantity and the LED light switching frequency, the target switching frequency corresponding to the target quantity may be determined, as well as the target LED light with the target switching frequency. Further, it may be determined that the current position of the CMOS camera is near the target LED light (experiments show that it can be located within 5 meters of the target LED light). The LED lights are used effectively for indoor positioning, and with the assistance of other positioning technologies, accurate positioning of mobile terminals can be achieved.

It should be understood that the various numerical numbers involved in the embodiments of the disclosure are only used for the convenience of description and are not used to limit the scope of the embodiments of the disclosure.

It is understood by persons skilled in the art that the above description is only preferred embodiments of the disclosure and the embodiments are not intended to limit the disclosure. Any modifications, equivalent substitutions, and improvements made within the spirit and principles of the disclosure should be included in the protection scope of the disclosure.

What is claimed is:

1. An LED light identification method, comprising:
    obtaining a background frame and a spline frame by a CMOS camera in an LED lighting environment, wherein the background frame is an image without dark stripes, and the spline frame is an image with dark stripes;

determining a target quantity of dark stripes in the spline frame by comparing the background frame with the spline frame;

determining a target switching frequency corresponding to the target quantity based on a predetermined corresponding relationship and the target quantity, wherein the predetermined corresponding relationship is configured to characterize a corresponding relationship between a dark stripe quantity and an LED light switching frequency, and the target switching frequency is configured to mark LED lights;

wherein each of the LED lights in the LED lighting environment adopts a default switching frequency f and a target switching frequency $f_i$ respectively in two adjacent lighting intervals, different LED lights adopt different target switching frequencies, f>W/S, $f_i$<W/S, T>2S, S represents a shutter duration of the CMOS camera, the CMOS camera collects images by adopting a column-by-column scanning manner, W represents a width of the image collected by the CMOS camera, and T represents the lighting interval;

wherein determining the target quantity of the dark stripes in the spline frame by comparing the background frame with the spline frame comprises:

calculating a frame difference and performing binarization based on the background frame, the spline frame, and a binarization threshold, and obtaining a binary image, wherein a value of each pixel in the binary image is configured to characterize a difference between the background frame and the spline frame at a corresponding pixel, and a difference characterized by a binary value 1 is greater than a difference characterized by a binary value 0;

determining a one-dimensional array by calculating a quantity of the pixels having the binary value 0 in each column in the binary image;

performing window division for gradient calculation on the one-dimensional array based on a predetermined window size to generate a window linked list, wherein the window linked list is configured to store window values corresponding to respective windows in a linked list manner;

comparing the window values corresponding to the respective windows based on the window linked list and determining states corresponding to the respective windows, wherein the states corresponding to the windows are configured to characterize whether a column selected of the window has the dark stripes;

determining the target quantity of the dark stripes in the spline frame based on the states corresponding to the respective windows;

wherein performing window division for gradient statistics on the one-dimensional array based on the predetermined window size to generate the window linked list comprises:

calculating the window values corresponding to the respective windows based on a predetermined accumulated gradient calculation configuration;

generating the window linked list in the linked list manner based on the window values corresponding to the respective windows;

wherein calculating configuration based on the predetermined accumulated gradient is configured to indicate:

for a first window, in response to an absolute value of the accumulated gradient being smaller than or equal to a predetermined critical threshold, a mean value of all array elements in the first window is used as the window value of the entire window, in response to the accumulated gradient being smaller than a negative value of the predetermined critical threshold, a value of a first array element in the first window is used as the window value of the entire window and the state corresponding to the first window is set to a top state, wherein the top state is configured to characterize that the column selected of the window does not have the dark stripes; in response to the accumulated gradient being greater than the predetermined critical threshold, the value of the first array element in the first window is used as the window value of the entire window and the state corresponding to the first window is set to a bottom state, wherein the bottom state is configured to characterize that the column selected of the window has the dark stripes;

for any target window except the first window, in response to the absolute value of the accumulated gradient being smaller than or equal to the predetermined critical threshold, the mean value of all array elements in the target window is used as the window value of the entire window; otherwise, a value of a last array element in the target window is used as the window value of the entire window;

wherein comparing the window values corresponding to the respective windows based on the window linked list and determining the states corresponding to the respective windows comprises:

performing merging on the windows in the window linked list according to a predetermined window merging configuration, and obtaining a window linked list after merging the windows, wherein the predetermined window merging configuration is configured to indicate that for two adjacent windows, if an absolute value of a difference between window values corresponding to the two windows is smaller than or equal to a predetermined window difference, then the two windows are merged;

for the window linked list after merging the windows, determining the state corresponding to the first window based on the window value corresponding to the first window and a window value corresponding to an ordered second window in response to the state corresponding to the first window being not determined;

for the window linked list after merging the windows, determining states corresponding to respective intermediate windows based on the state corresponding to the first window and the window values corresponding to the respective windows;

for the window linked list after merging the windows, determining a state corresponding to a last window based on a window value corresponding to a reversed second window and a window value corresponding to the last window.

2. The LED light identification method as claimed in claim 1, wherein for the window linked list after merging the windows, determining the state corresponding to the first window based on the window value corresponding to the first window and the window value corresponding to the ordered second window in response to the state corresponding to the first window being not determined comprises:

comparing values of the window value corresponding to the first window and the window value corresponding to the ordered second window;

if the window value corresponding to the first window is smaller than the window value corresponding to the ordered second window, then determining the state corresponding to the first window to be the bottom state; otherwise, determining the state corresponding to the first window to be the top state.

3. The LED light identification method as claimed in claim 1, wherein for the window linked list after merging the windows, determining the states corresponding to the respective intermediate windows based on the state corresponding to the first window and the window values corresponding to the respective windows comprises:

for the window linked list after merging the windows, performing an operation of recursively setting the states of the intermediate windows starting from the reversed second window;

wherein the operation of recursively setting the states of the intermediate windows specifically comprises:

if a state corresponding to a previous window of a target intermediate window is not determined, then performing the operation of recursively setting the state of the intermediate window on the previous window of the target intermediate window;

if the state corresponding to the previous window of the target intermediate window is determined, then determining a state corresponding to the target intermediate window or merging the window based on a predetermined intermediate window processing configuration, the state corresponding to the previous window of the target intermediate window, a window value corresponding to the target intermediate window, and a window value corresponding to a next window of the target intermediate window;

wherein the predetermined intermediate window processing configuration is configured to indicate:

if the state corresponding to the previous window of the target intermediate window is the top state, in response to the window value corresponding to the target intermediate window being smaller than the window value corresponding to the next window of the target intermediate window, setting the state corresponding to the target intermediate window to the bottom state; in response to the window value corresponding to the target intermediate window being greater than the window value corresponding to the next window of the target intermediate window, merging the target intermediate window with the next window of the target intermediate window, and using the window value corresponding to the next window of the target intermediate window as a window value corresponding to the merged window;

if the state corresponding to the previous window of the target intermediate window is the bottom state, in response to the window value corresponding to the target intermediate window being greater than the window value corresponding to the next window of the target intermediate window, setting the state corresponding to the target intermediate window to the top state; in response to the window value corresponding to the target intermediate window being smaller than the window value corresponding to the next window of the target intermediate window, merging the target intermediate window with the next window of the target intermediate window, and using the window value corresponding to the next window of the target intermediate window as the window value corresponding to the merged window.

4. The LED light identification method as claimed in claim 1, wherein for the window linked list after merging the windows, determining the state corresponding to the last window based on the window value corresponding to the reversed second window and the window value corresponding to the last window comprises:

in response to the window value corresponding to the last window being smaller than the window value corresponding to the reversed second window, then setting the state corresponding to the last window to the bottom state; otherwise, setting the state corresponding to the last window to the top state.

5. An LED light identification device, comprising:

an image obtaining module configured to obtain a background frame and a spline frame by a CMOS camera in an LED lighting environment, wherein the background frame is an image without dark stripes, and the spline frame is an image having dark stripes;

a dark stripe determination module configured to determine a target quantity of dark stripes in the spline frame by comparing the background frame with the spline frame;

a switching frequency determination module configured to determine a target switching frequency corresponding to the target quantity based on a predetermined corresponding relationship and the target quantity, wherein the predetermined corresponding relationship is configured to characterize a corresponding relationship between a dark stripe quantity and an LED light switching frequency, and the target switching frequency is configured to mark LED lights;

wherein each of the LED lights in the LED lighting environment adopts a default switching frequency f and a target switching frequency $f_i$ respectively in two adjacent lighting intervals, different LED lights adopt different target switching frequencies, $>W/S$, $f_i<W/S$, $T>2S$, S represents a shutter duration of the CMOS camera, the CMOS camera collects images by adopting a column-by-column scanning manner, W represents a width of the image collected by the CMOS camera, and T represents the lighting interval;

wherein determining the target quantity of the dark stripes in the spline frame by comparing the background frame with the spline frame comprises:

calculating a frame difference and performing binarization based on the background frame, the spline frame, and a binarization threshold, and obtaining a binary image, wherein a value of each pixel in the binary image is configured to characterize a difference between the background frame and the spline frame at a corresponding pixel, and a difference characterized by a binary value 1 is greater than a difference characterized by a binary value 0;

determining a one-dimensional array by calculating a quantity of the pixels having the binary value 0 in each column in the binary image;

performing window division for gradient statistics on the one-dimensional array based on a predetermined window size to generate a window linked list, wherein the window linked list is configured to store window values corresponding to respective windows in a linked list manner;

comparing the window values corresponding to the respective windows based on the window linked list and determining states corresponding to the respective windows, wherein the states corresponding to the windows are configured to characterize whether a column selected of the window has the dark stripes;

determining the target quantity of the dark stripes in the spline frame based on the states corresponding to the respective windows;

wherein performing window division for gradient statistics on the one-dimensional array based on the predetermined window size to generate the window linked list comprises:

calculating configuration based on a predetermined accumulated gradient, and calculating the window values corresponding to the respective windows;

generating the window linked list in the linked list manner based on the window values corresponding to the respective windows;

wherein calculating configuration based on the predetermined accumulated gradient is configured to indicate:

for a first window, in response to an absolute value of the accumulated gradient being smaller than or equal to a predetermined critical threshold, a mean value of all array elements in the first window is used as the window value of the entire window, in response to the accumulated gradient being smaller than a negative value of the predetermined critical threshold, a value of a first array element in the first window is used as the window value of the entire window and the state corresponding to the first window is set to a top state, wherein the top state is configured to characterize that the column selected of the window does not have the dark stripes; in response to the accumulated gradient being greater than the predetermined critical threshold, the value of the first array element in the first window is used as the window value of the entire window and the state corresponding to the first window is set to a bottom state, wherein the bottom state is configured to characterize that the column selected of the window has the dark stripes;

For any target window except the first window, in response to the absolute value of the accumulated gradient being smaller than or equal to the predetermined critical threshold, the mean value of all array elements in the target window is used as the window value of the entire window;

otherwise, a value of a last array element in the target window is used as the window value of the entire window;

wherein comparing the window values corresponding to the respective windows based on the window linked list and determining the states corresponding to the respective windows comprises:

performing merging on the windows in the window linked list according to a predetermined window merging configuration, and obtaining a window linked list after merging the windows, wherein the predetermined window merging configuration is configured to indicate that for two adjacent windows, if an absolute value of a difference between window values corresponding to the two windows is smaller than or equal to a predetermined window difference, then the two windows are merged;

for the window linked list after merging the windows, determining the state corresponding to the first window based on the window value corresponding to the first window and a window value corresponding to an ordered second window in response to the state corresponding to the first window being not determined;

for the window linked list after merging the windows, determining states corresponding to respective intermediate windows based on the state corresponding to the first window and the window values corresponding to the respective windows;

for the window linked list after merging the windows, determining a state corresponding to a last window based on a window value corresponding to a reversed second window and a window value corresponding to the last window.

6. An electronic apparatus, comprising:
at least one memory configured to store a program;
at least one processor configured to execute the program stored in the memory, wherein in response to the program stored in the memory being executed, the processor is configured to execute the method as claimed in claim 1.

7. An electronic apparatus, comprising:
at least one memory configured to store a program;
at least one processor configured to execute the program stored in the memory, wherein in response to the program stored in the memory being executed, the processor is configured to execute the method as claimed in claim 2.

8. An electronic apparatus, comprising:
at least one memory configured to store a program;
at least one processor configured to execute the program stored in the memory, wherein in response to the program stored in the memory being executed, the processor is configured to execute the method as claimed in claim 3.

9. An electronic apparatus, comprising:
at least one memory configured to store a program;
at least one processor configured to execute the program stored in the memory, wherein in response to the program stored in the memory being executed, the processor is configured to execute the method as claimed in claim 4.

10. A non-transitory computer-readable storage medium, wherein the non-transitory computer-readable storage medium stores a computer program, and in response to the computer program being in operation on a processor, the processor is caused to execute the method as claimed in claim 1.

11. A non-transitory computer-readable storage medium, wherein the non-transitory computer-readable storage medium stores a computer program, and in response to the computer program being in operation on a processor, the processor is caused to execute the method as claimed in claim 2.

12. A non-transitory computer-readable storage medium, wherein the non-transitory computer-readable storage medium stores a computer program, and in response to the computer program being in operation on a processor, the processor is caused to execute the method as claimed in claim 3.

13. A non-transitory computer-readable storage medium, wherein the non-transitory computer-readable storage medium stores a computer program, and in response to the computer program being in operation on a processor, the processor is caused to execute the method as claimed in claim 4.

* * * * *